June 19, 1951 J. E. HAWLEY 2,557,429
SURGICAL BONE SAW DRIVE
Filed Oct. 28, 1949 3 Sheets-Sheet 1
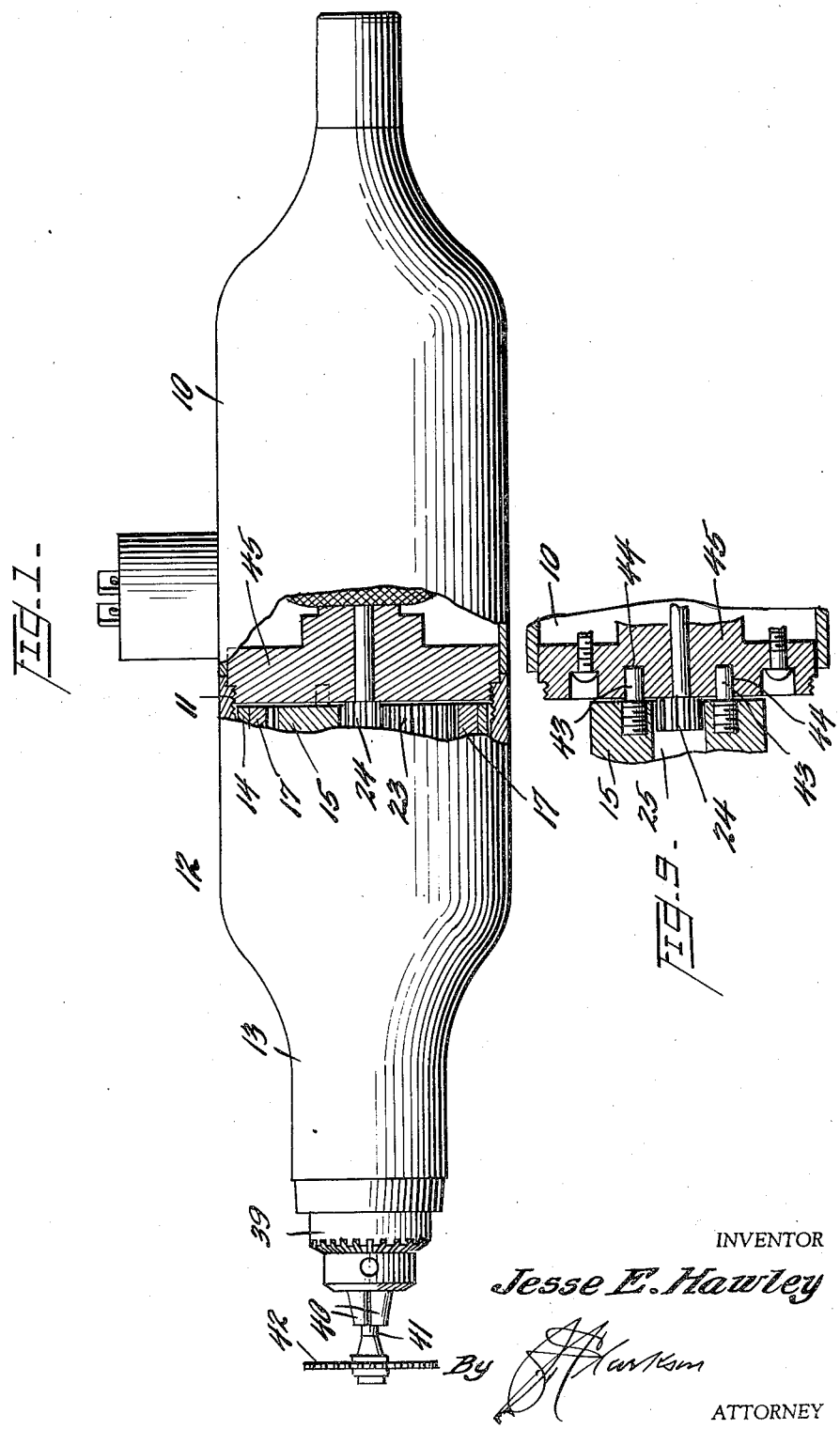
INVENTOR
Jesse E. Hawley
By [signature]
ATTORNEY June 19, 1951  J. E. HAWLEY  2,557,429
SURGICAL BONE SAW DRIVE
Filed Oct. 28, 1949  3 Sheets-Sheet 2
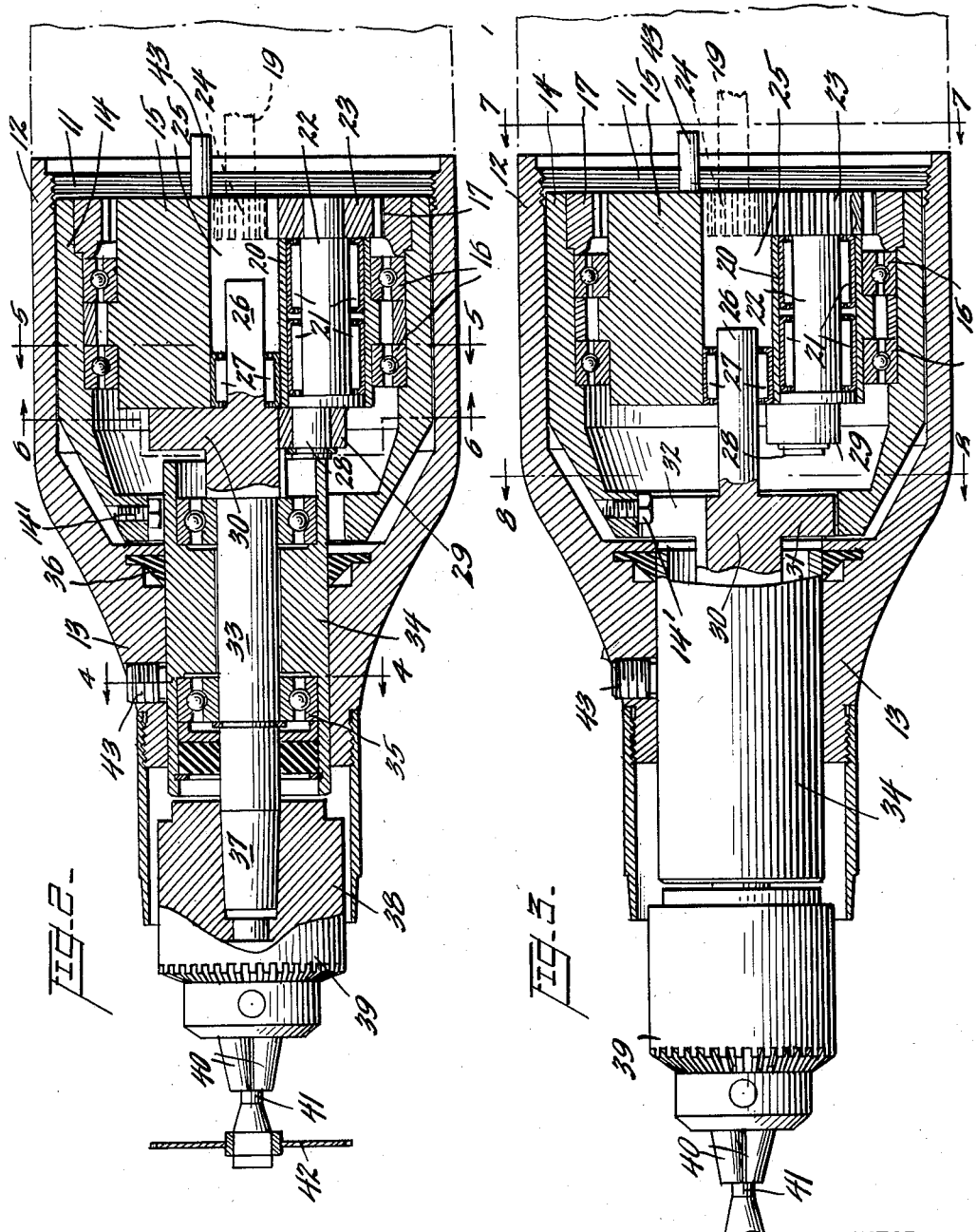
INVENTOR.
Jesse E. Hawley,
BY
ATTORNEY.

June 19, 1951  J. E. HAWLEY  2,557,429
SURGICAL BONE SAW DRIVE
Filed Oct. 28, 1949  3 Sheets-Sheet 3
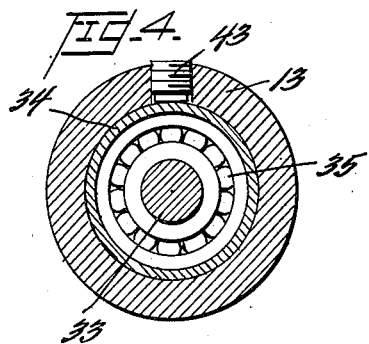
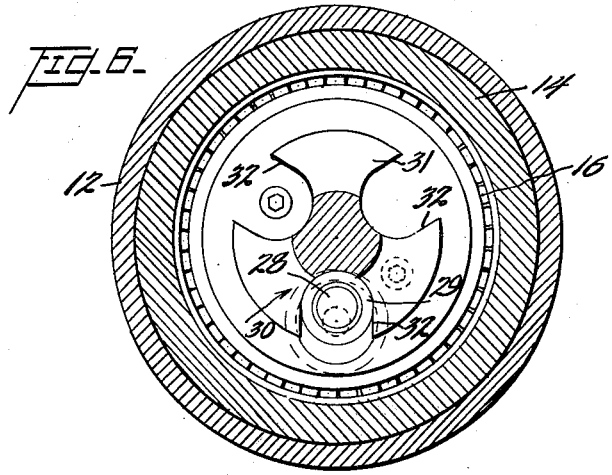
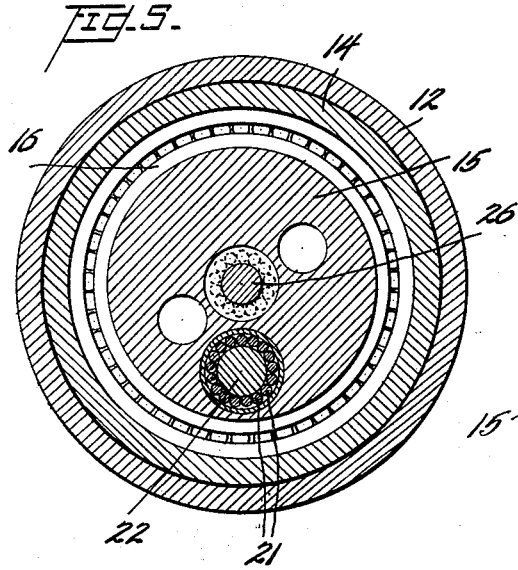
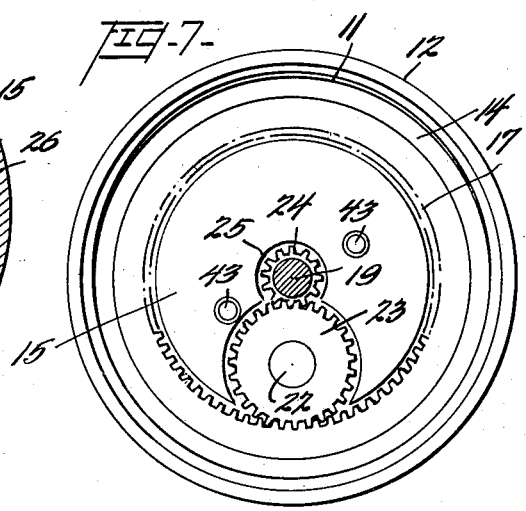
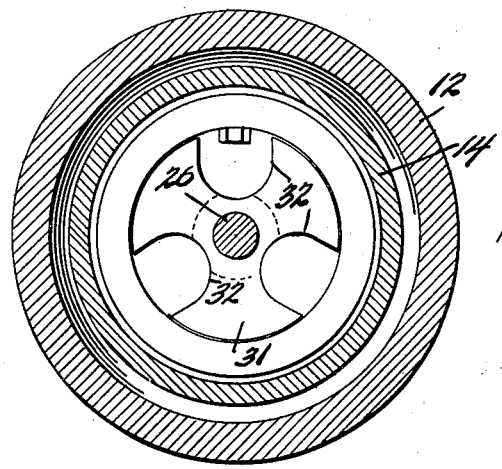
INVENTOR.
Jesse E. Hawley,
BY
ATTORNEY.

Patented June 19, 1951

2,557,429

UNITED STATES PATENT OFFICE 2,557,429

SURGICAL BONE SAW DRIVE

Jesse E. Hawley, Phoenix, Ariz., assignor to Zimmer Manufacturing Company, Warsaw, Ind.

Application October 28, 1949, Serial No. 124,107

8 Claims. (Cl. 74—48)

This invention relates to a saw capable of being transformed from a rotary to an oscillatory saw.

More particularly the invention relates to a saw adapted for surgical purposes.

In certain instances it is desirable to have a saw which will cut off casts without inflicting injury on the tissues under the cast, that is to say the flesh. In other instances it is desirable in surgical work to have a saw that will cut right straight through the overlying tissues and the bone.

The principal object of this invention is to provide a motor driven saw which may be readily changed from an oscillatory motion for cutting through casts without injuring the underlying tissues or a rotary motion for cutting straight through bones.

Another important object of the invention is to provide a saw of this description which may be readily changed from oscillatory to rotary motion.

A further important object of the invention is to provide a saw of this character which may be changed from oscillatory to rotary motion by a simple movement of one part relative to the other.

It is to be understood, in this respect, that when it is desirable to cut a cast off a person's body one cannot use a continuously rotating saw without danger of injuring the patient by cutting into the soft tissues. However, it is possible to cut through a hard cast by a vibratory motion of the saw and yet when the saw edge contacts the soft tissues the vibratory motion will be so fast that it will not cut into the tissues even after it has cut through the hard cast. Obviously, a saw which only has a vibratory motion would not be effective in a surgeon's hands to sever underlying bones and the like. Therefore, for a saw to be effective it must have the property of changing from vibratory motion sufficient to cut casts to the rotary motion enabling the surgeon to sever bone.

With the above and other objects in view, as will be hereinafter apparent, the invention consists in general of a motor driven saw having selectivity between vibratory and rotary motions, the same being hereinafter fully described, illustrated in the accompanying drawings and particularly claimed.

In the accompanying drawings, like characters of reference indicate like parts in the several views, and:

Fig. 1 illustrates a side elevation, partly in section, showing the complete saw with its motor, the motor being shown as connected to the saw.

Fig. 2 is an enlarged diametric section through the saw as shown with the parts in position for obtaining oscillatory motion of the cutting saw.

Fig. 3 is a smaller view showing the parts arranged for continuous rotary motion of the saw.

Fig. 4 is a detailed section on the line 4—4 of Fig. 2.

Fig. 5 is a detailed section on the line 5—5 of Fig. 2.

Fig. 6 is a detailed section on the line 6—6 of Fig. 2 and showing the parts arranged for oscillatory engagement.

Fig. 7 is a rear end elevation of the saw proper detached from the motor.

Fig. 8 is a view on the line 8—8 of Fig. 3 and showing the arrangement of the parts when the oscillatory device has been moved to free the saw from oscillatory motion and to produce the continuous rotary motion.

Fig. 9 is a longitudinally fragmentary view of Fig. 1 taken substantially at right angles to said Fig. 1.

The principal part of this invention concerns the front end which is to be attached to the motor indicated in general by 10. Provision is made by the threads 11 for connecting the body of the motor to the front end and this front end includes a shell 12 having an enlarged rear end to screw on the motor and then having a reduced front end 13. In the rear end 12 there is fitted a sleeve 14 which is rotatably mounted on a cylindrical member 15 by ball bearings 16 so that the sleeve 14 may freely revolve thereon. Within the sleeve 14 is fixed an internal gear 17 which is normally engaged by a gear 23 driven by a gear 24 carried by the motor shaft 19. This arrangement, when the motor is in action, causes rotation of the cylindrical sleeve 14 on the bearings 16.

At one side of the cylindrical member there is provided a bore 20 wherein are disposed roller bearings 21 which support the shaft 22. On the rear end of this shaft is mounted a gear 23 which meshes with the gear 17 and is driven by the gear 24 mounted on the motor shaft 19. Thus this arrangement causes rotation of the sleeve 14.

The internal cylinder 15 has a bore 25 and slidably and rotatably mounted in this bore is a shaft 26 supported by roller bearings 27.

On the forward end of the shaft 22 there is formed a crank pin 28 which is surrounded by a rotary sleeve 29. On the shaft 26 is formed what is known as a Scotch yoke 30. That is to say, there is on this shaft a disc, best shown in Fig. 8, wherein this Scotch yoke is indicated as a disc 31 having a series of radial slots 32 around its periphery so that the crank pin shown well in Fig. 6 may drop into a selective one of these slots. Now the throw of the crank pin is quite short so that when the Scotch yoke is engaged on the crank pin there is no disengagement from the pin but only an oscillatory motion of the yoke as the shaft 22 revolves.

The shaft carrying the Scotch yoke is extended forwardly as at 33 and is supported in a sleeve 34 mounted in the forward end of the housing 10 by means of suitable ball bearings 35. Also packing 36 may be provided to prevent loss of lubrication at various points. The shaft 33 has a forward end 37 of the usual tapered form and wherein is fitted a collet 38 having a rotary member 39 which by rotation opens and closes the jaws 40 of the collet for grasping the shank 41 of the saw selected to be used in connection with the operation to be performed.

A set screw 43 extends through the forward end of the shell 12 so as to lock the sleeve 34 against sliding movement when desired.

In the front end of the motor housing is fixed a block 45 wherein is formed a plurality of sockets 44 for the reception of pins 43 carried by the member 15 so that it is prevented from rotation.

It is also to be noted that the member 14 has projecting therethrough a key pin or screw 14¹ which is so positioned that, upon adjustment of the saw to produce oscillation, this key 14¹ will engage in one of the slots 32 and thus effect continuous rotation of the saw.

Now considering the operation of the device, the sleeve 34 is movable longitudinally, and when so moved carries with it the shaft 33 and the Scotch yoke. Obviously the set screw 43 is used to prevent accidental movement of this character.

However, the gear 24 will drive through the gear 23 the sleeve 14 by means of the internal gear 17. Thus the crank 28 will rotate continuously whether or not the device is set for oscillatory or continuous rotary motion.

However, if the set screw 43 be loosened then the sleeve 34 may be moved forwardly or backwardly. When the sleeve is moved forwardly then the Scotch yoke is disengaged from the crank pin 28 and its sleeve 20 so that the motion is continuous and rotary. However, if the sleeve 34 be pushed backwardly until the crank pin and its sleeve 29 engage in one of the slots of the Scotch yoke then rotary motion will cease and oscillatory motion will take its place.

The oscillatory motion produced by this arrangement is very rapid and while it will cut through a hard surface or body like a plaster cast yet when it strikes the flesh, after cutting through the cast, it will simply oscillate thereon without any damage to the flesh and it will be practically impossible to force such an oscillatory member at the high speed at which it runs to do any cutting on the flesh.

What is claimed, is:

1. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, and a driving connection between said driving sleeve and main shaft, said bearing means being slidable in said housing, the driving connection between the sleeve and main shaft operating continuously with the sleeve at one end of its longitudinal movement.

2. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, and a driving connection between said driving sleeve and main shaft, said bearing means being slideable in said housing, the driving connection between the sleeve and main shaft operating continuously with the sleeve at one end of its longitudinal movement and being freely inoperative upon the bearing means being at the opposite end of its longitudinal movement.

3. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, and oscillating means to produce oscillatory movement of said shaft upon the bearing means being at the opposite end of its longitudinal movement.

4. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, and oscillating means to produce oscillatory movement of said shaft upon the bearing means being at the opposite end of its longitudinal movement and thereby disengaged from connection to said sleeve.

5. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, oscillating means to produce oscillatory movement of said shaft upon the bearing means being at the opposite end of its longitudinal movement, said oscillating means including a second shaft mounted in the housing parallel to the main shaft, a crank on the end of the second shaft, and a yoke fixed on the main shaft and movable therewith into and out of operative engagement with said crank.

6. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, oscillating means to produce oscillatory movement of said shaft upon the bearing means being at the opposite end of its longitudinal movement and thereby disengaged from connection to said sleeve, said oscillating means including a second shaft mounted in the housing parallel to the main shaft, a crank on the end of the second shaft, and a yoke fixed on the main shaft and movable therewith into and out of operative engagement with said crank.

7. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, oscillating means to produce oscillatory movement of said shaft upon the bearing means being at the opposite end of its longitudinal movement, said oscillating means including a second shaft mounted in the housing parallel to the main shaft, a crank on the end of the second shaft, a yoke fixed on the main shaft and movable therewith into and out of operative engagement with said crank, and a gear connection between the second shaft and said sleeve.

8. In a surgical saw, a hollow cylindrical body forming a housing, a driving sleeve mounted in said housing, means to rotate said driving sleeve including an idler gear, a main shaft axially mounted in said housing for rotative and longitudinal movement therein, bearing means carried by the forward end of the housing and supporting said shaft, a driving connection between said driving sleeve and main shaft, said bearing means being slidable in said housing, the driving connection between the sleeve and main shaft operating continuously with the sleeve at one end of its longitudinal movement, oscillating means to produce oscillatory movement of said shaft upon the bearing means being at the opposite end of its longitudinal movement and thereby disengaged from connection to said sleeve, said oscillating means including a second shaft mounted in the housing parallel to the main shaft, a crank on the end of the second shaft, a yoke fixed on the main shaft and movable therewith into and out of operative engagement with said crank, and a gear connection between the second shaft and said sleeve.

JESSE E. HAWLEY.

REFERENCES CITED

The following references are of record in the file of this patent:

UNITED STATES PATENTS

| Number | Name | Date |
| --- | --- | --- |
| 1,318,707 | Tideman | Oct. 14, 1919 |
| 1,397,567 | Weyandt | Nov. 22, 1921 |
| 1,478,993 | Tillman | Dec. 25, 1923 |